June 29, 1943.  E. M. WAYLAND  2,323,171
METHOD FOR PREPARING WET PEACHES AND THE LIKE FOR DEFUZZING
Filed Aug. 10, 1938
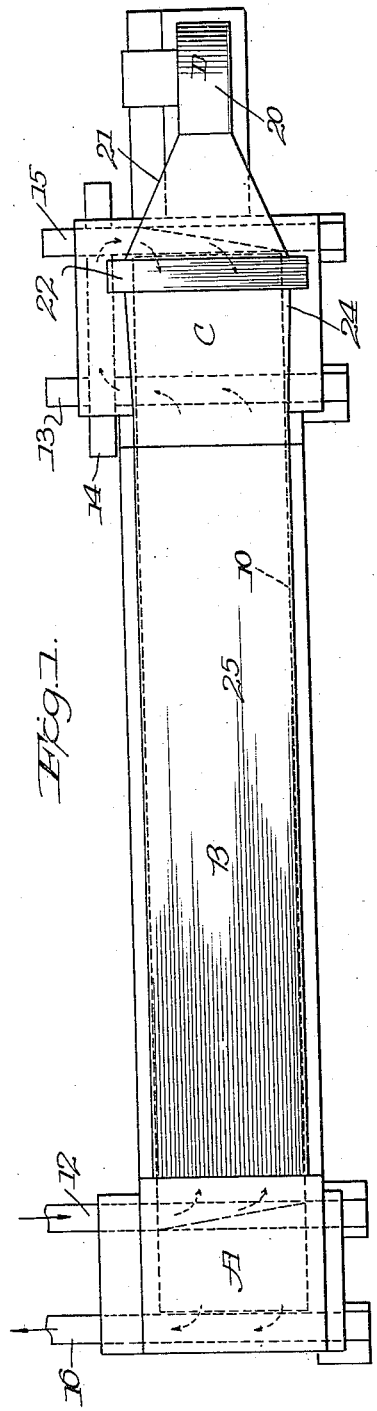
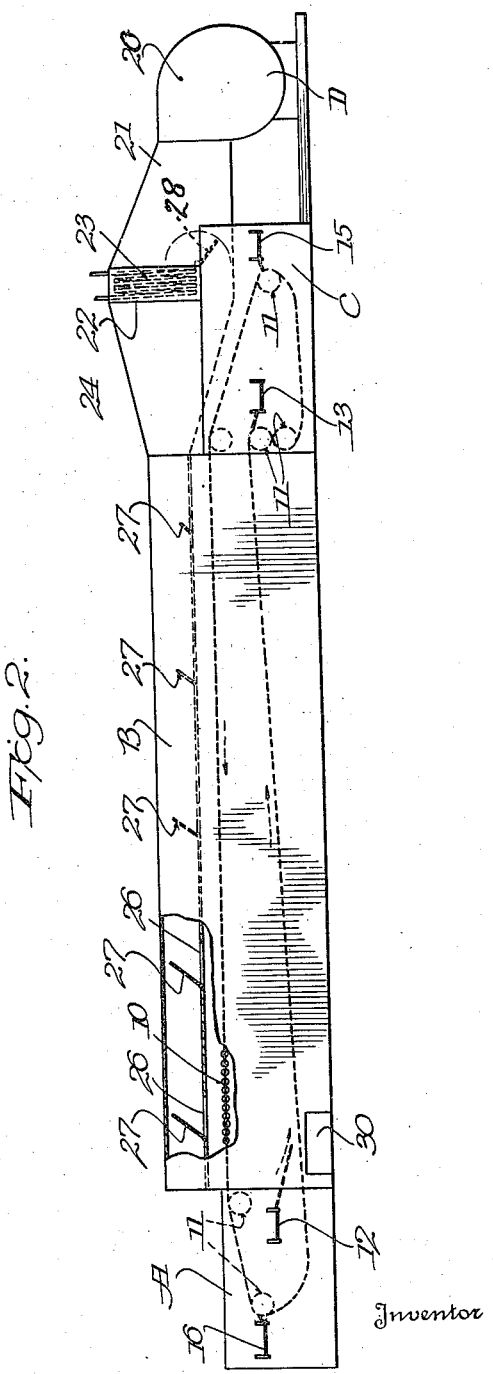
Inventor
Edwin M. Wayland.
By Emery, Booth, Holcomb & Miller
Attorneys Patented June 29, 1943

2,323,171

UNITED STATES PATENT OFFICE 2,323,171

METHOD FOR PREPARING WET PEACHES AND THE LIKE FOR DEFUZZING

Edwin M. Wayland, Covesville, Va.

Application August 10, 1938, Serial No. 224,168

10 Claims. (Cl. 34—31)

The present invention relates to the method of and apparatus for preparing peaches preparatory to de-fuzzing, drying potatoes to prevent blue mould and like purposes.

In preparing fresh peaches for market it is advisable to remove the fuzz from them and this has conveniently been done by brushing. If the fuzz is not absolutely dry, it cannot be satisfactorily removed by brushing, and the brushing operation merely smears the fuzz over the peach. Therefore, peaches that are packed wet do not have as pleasing an appearance, cannot be satisfactorily brushed, and have a market value of from 75 cents to one dollar less than the same fruit properly de-fuzzed.

The peach harvest season usually lasts, in any one location, for a relatively short time, i. e. ten days or two weeks. Peaches must be picked at a proper degree of ripeness as their commercial value is practically lost if permitted to get soft. Since rainy periods of from one or two days to a week or ten days duration often prevail during peach harvesting time, peach growers and packers have had to suffer considerable loss in revenue due to the inability to de-fuzz the wet peaches.

My invention aims to provide a simple and efficient method and apparatus for preparing wet peaches for de-fuzzing which would enable the packer to market the peaches in the most attractive form and at the most advantageous price.

According to the invention, wet peaches may be prepared for de-fuzzing by subjecting them, preferably while being rotated, to the drying atmosphere of a large volume of air conditioned at an elevated temperature and moving at such velocity to quickly evaporate the moisture from the fuzz on the peach, but below such temperature that might damage the peach or reduce its market value as a fresh peach. I have discovered that the moisture in the fuzz of a wet peach may be satisfactorily dried preparatory to de-fuzzing by subjecting the wet peaches in a closed chamber to frequent changes of air conditioned at an elevated temperature of about 130° F. The volume of air advantageously is at least 25 cu. ft. per min. per bushel of peaches and proper conditioning may be effected by subjecting the fruit to this air current for a period of four to six minutes. Such conditions have been found to be satisfactory under most extreme conditions, as for example, when the peaches are picked during the rain and reach the packing room almost dripping wet.

Suitable apparatus for carrying out the method is illustrated in the accompanying drawing in which Fig. 1 is a plan view thereof; and Fig. 2 is a vertical longitudinal sectional view thereof.

The machine according to the illustrated embodiment may advantageously comprise a receiving and delivery section A, an elongated enclosed drying section B, a transfer section E and a fan section D. An endless travelling conveyor 10, preferably a live roll conveyor, suitable for rotating the fruit during its travel through the machine, is mounted in sections A, B and C trained over driven rolls 11, as shown in Fig. 2. The fruit is delivered upon the lower run of the conveyor 10 by means of a transversely disposed horizontal loading belt 12, and then is carried by said conveyor through the drying section B. In the transfer section C the fruit is discharged from the lower run of the conveyor 10 upon a transfer belt 13, thence to belts 14 and 15 and returned to the upper run of the conveyor 10, so that it may again be carried through the drying section B, the dried fruit being discharged on a delivery belt 16. The construction and arrangement of the live roll conveyor 10, with the belts 12 and 16 at the receiving and delivery end and also the transfer belts 13, 14 and 15, are old and have been used in other types of apparatus for conveying fruit, and it is believed that the construction and operation of these conveying parts per se will be apparent to those skilled in the art without further explanation.

The fan section D may comprise a fan 20 discharging into an air duct 21 leading to a closed heater chamber 22 in which is placed a suitable heater element 23, as for example a steam heated coil. A duct 24 connects the heater chamber 22 to an elongated air duct 25 overlying the drying chamber and discharging heated air therein. This duct 25 is formed with a plurality of outlets 26, each provided with an individual baffle 27, the length of the baffles 27 increasing progressively from the fan end, so that the velocity of heated air discharged through the openings 25 is substantially uniform throughout the length of the drying chamber. A damper 28 positioned in the duct 21 in advance of the heating chamber 22 provides for by-passing, when and if desired, a portion of the air delivered by the fan 20 away from the heater chamber and in to the lower part of the drying chamber B. The amount of air that should be by-passed away from the heater is variable, depending upon the room temperature conditions, but satisfactory drying throughout a wide temperature and humidity range may be effected by reason of the selective positioning of the damper.

I have discovered that proper drying of the fruit may be quickly effected when the drying temperature is above normal room temperature approximately 60° F. For best results the temperature of the drying atmosphere may be between 120° and 140° F. Due to the large volume of air being circulated past the peaches, the peaches are cooler to the touch than before, notwithstanding the increased temperature of the air. The maximum temperature to which the air may be heated without injury to the fresh fruit has not yet been determined, due to the fact that a temperature of approximately 130° F. has proved satisfactory under most severe conditions. With a drying atmosphere in the neighborhood of 130° F. the machine may be operated to reach 200 bu. per hour while using a conveyor four feet wide and an air volume of approximately 5000 c. f. m. and maintaining the peaches in said air current for approximately four minutes. The evaporation of the moisture from the fuzz on the peach skin in this short time is sufficiently complete that the fuzz may be readily removed by standard brushing practice.

The action of the large volume of conditioned air delivered through the openings 26 against the rotating peaches causes a rapid evaporation of the moisture on the fuzzy skin of the peaches and a cooling of the fruit. This rapid evaporating enables a high speed operation of the conveyor 10, so that the fruit is not subjected to severe drying, such as might reduce its commercial value as fresh fruit. The heated air advantageously may escape from the drying chamber only at a selected opening, such as at 30, near the bottom of the section B and at the end opposite the fan, so that it must contact the fruit travelling on the lower run of the conveyor 10 and effect a preliminary drying thereof.

My invention above described while particularly advantageous for preparing wet peaches for de-fuzzing is also applicable to other treatments of fruits and vegetables, as for example in treating potatoes to prevent the development of blue mould.

Also potatoes shipped from far southern areas must be washed to remove black muck soil in which they are grown and then should be dried before packing to prevent blue mould attacking the potatoes after packing, causing heavy losses. By drying the wet potatoes according to the method and apparatus herein described, losses due to blue mould are largely eliminated.

While I have shown and described a preferred form of apparatus suitable for practicing the invention, and have described a method highly successful under most severe conditions, it will be apparent to those skilled in the art that variations thereof are within the scope of the invention as well as the appended claims.

I claim:

1. The method of preparing wet fruits and vegetables for packing which comprises the steps of disposing the articles in a pre-defined area and subjecting the articles in said area to a heated blast of relatively high velocity air of a temperature in excess of 100° F. and short of that which will cook the articles, to rapidly evaporate the moisture from the skins of the articles without substantially increasing the temperature thereof.

2. The method of preparing wet fruits and vegetables which comprises the steps of disposing the articles in a pre-defined area and subjecting the articles in said area to a heated blast of relatively high velocity air of a temperature approximately 130° F. and short of that which will cook the articles to rapidly evaporate the moisture from the skins of the articles without substantially increasing the temperature thereof.

3. The method of preparing wet fruits and vegetables which comprises the steps of disposing the articles in a pre-defined area and subjecting the articles in said area to a heated blast of relatively high velocity air of a temperature between 120° F. and 140° F. and short of that which will cook the articles, to rapidly evaporate the moisture from the skins of the articles without substantially increasing the temperature thereof.

4. The method of preparing wet fruits and vegetables for packing which comprises the step of moving the wet articles through a pre-defined area and subjecting the moving articles in said area to a heated blast of air of a temperature in excess of 100° F. and of a velocity of approximately 1250 cubic feet per minute for each foot width of moving articles to rapidly evaporate the moisture from the skins of said articles.

5. The method of preparing wet fruits and vegetables for packing which comprises the step of moving and rotating the wet articles through a pre-defined area and subjecting the moving articles in said area to a heated blast of air of a temperature in excess of 100° F. and of a velocity of approximately 1250 cubic feet per minute for each foot width of moving articles to rapidly evaporate the moisture from the skins of said articles.

6. The method of preparing wet fruits and vegetables for packing which comprises the step of moving the wet articles through a pre-defined area and subjecting the moving articles in said area to a heated blast of air of a temperature in excess of 100° F. and of a velocity of at least 25 cubic feet per minute per bushel of articles to rapidly evaporate moisture from the skins of said articles.

7. The method of preparing wet fruits and vegetables for packing which comprises the step of moving the wet articles through a pre-defined area and subjecting the moving articles in said area for a period of from 4 to 6 minutes to a heated blast of air of a temperature in excess of 100° F. and of a velocity of at least 25 cubic feet per minute per bushel of articles to rapidly evaporate moisture from the skins of said articles.

8. The method of preparing wet peaches for de-fuzzing which comprises the steps of moving the wet peaches through a pre-defined area and subjecting the moving peaches in said area to a heated blast of air of a temperature in excess of 100° F. and of a velocity of approximately 25 cubic feet per minute to rapidly evaporate moisture from the skins of the peaches without effectively increasing the temperature of the peaches to leave the fuzz dry and capable of being removed by brushing.

9. The method of preparing wet peaches for de-fuzzing and packing which comprises the steps of moving the wet peaches in a pre-defined area, subjecting the peaches while in said area to a heated blast of air of a temperature of approximately 130° F. and of a velocity of approximately 25 cubic feet per minute per barrel and for a period of approximately 4 to 6 minutes to rapidly evaporate moisture from the skin of said peaches and surface-dry the same.

10. The method of preparing wet potatoes for packing, which comprises moving the potatoes through a pre-defined area, subjecting the potatoes in said area to a blast of heated air of a temperature of approximately 130° F. for a period of from 4 to 6 minutes and under a velocity of approximately 5000 cubic feet per minute to rapidly evaporate moisture from the skin of the potatoes without substantially increasing the temperature thereof.

EDWIN M. WAYLAND.